United States Patent

[11] 3,575,610

[72] Inventor Toshio Okubo
Tokyo, Japan
[21] Appl. No. 758,507
[22] Filed Sept. 9, 1968
[45] Patented Apr. 20, 1971
[73] Assignee Nippon Electric Company, Limited
Tokyo, Japan
[32] Priority Sept. 20, 1967
[33] Japan
[31] 42/60386

[54] SCANNING PULSE GENERATOR
1 Claim, 2 Drawing Figs.

[52] U.S. Cl. .......... 307/223, 307/208, 307/221, 307/269, 307/304
[51] Int. Cl. .......... H03k 23/22, H03k 5/00
[50] Field of Search .......... 307/205, 208, 221, 223, 251, 269, 279, 304; 328/43

[56] References Cited

UNITED STATES PATENTS

| | | | |
|---|---|---|---|
| 3,001,087 | 9/1961 | Harloff | 328/43X |
| 3,322,974 | 5/1967 | Ahrons et al. | 307/221X |
| 3,497,715 | 2/1970 | Yen | 307/208X |

OTHER REFERENCES

IBM Technical Disclosure Bulletin, Vol. 8, No. 4, September 1965, pp. 640, 641, titled Field Effect Transistor Clocked Logic, written by C. E. Ruoff. A copy is located in class 307, subclass 208, in Art Unit 254.

*Primary Examiner*—Stanley T. Krawczewicz
*Attorney*—Hopgood and Calimafde

ABSTRACT: A device is described for generating a successive train of pulses on separate lines from a plurality of cascade-connected pulse generator stages. Each stage is composed of a pulse width expansion circuit driving a scanning pulse output circuit. A pair of square waves, one being the inversion of the other, is applied to each stage with one square wave being applied to the pulse width expansion circuit and the other to the scanning pulse output circuit. Each odd-numbered stage has its pulse width expansion circuit coupled to one square wave and its scanning pulse output circuit coupled to the other square wave. Each even-numbered stage has its circuit reversely connected to the square waves from the odd-numbered stages. Field effect transistors are employed to accomplish the pulse generation, thereby eliminating components such as resistors, capacitors and the like.

PATENTED APR 20 1971 3,575,610

INVENTOR.
TOSHIO OKUBO

BY

Hopgood & Calimafde

ATTORNEYS

SCANNING PULSE GENERATOR

This invention relates to a scanning pulse generator for generating a successive train of pulses used for scanning a solid-state image pickup or display device. More particularly, the instant invention relates to an improvement in the scanning pulse generator proposed in our copending U.S. application, Ser. No. 691,809, filed on Dec. 19, 1967, entitled SCANNING PULSE GENERATOR and assigned to the same assignee.

The scanning of a solid-state image pickup device is performed by sequentially scanning the photosensitive elements regularly arranged in a plane in rows and columns with a train of pulses periodically and sequentially applied to each row and column. The same is true with regard to an image display device.

Suitable circuits for generating the scanning pulse include a ring counter, a shift register and a matrix gate widely used in the computer field, each of which is mainly composed of flip-flop circuits. Any one of the above-mentioned circuits requires, in order to generate one scanning pulse, at least one flip-flop circuit composed of a number of components having different properties, such as transistors, diodes, resistors and capacitors. Accordingly, the scanning circuit cannot be easily miniaturized. Rather, it becomes so complicated that the manufacture of the conventional solid-state scanning pulse generator circuits is very difficult even when resorting to integrated circuit techniques. As a consequence, the miniaturization, reduction of power consumption and improvement in reliability which are aimed at by the adoption of solid-state techniques to image pickup and display devices are almost impossible to attain.

With the pulse generator of this invention which employs field-effect transistors, four components, which may all be field-effect transistors, are sufficient for generating a scanning pulse, and the component interconnection is very simple. Therefore, a multistage scanning pulse generator is easily fabricated on a single semiconductor substrate using integrated circuit techniques. It is, therefore, an object of this invention to provide a scanning pulse generator of small size, low power consumption and high reliability suitable for use in solid-state image pickup devices and display devices.

It is a further object of this invention to provide a pulse generator employing a minimum number of components.

Figure 1:
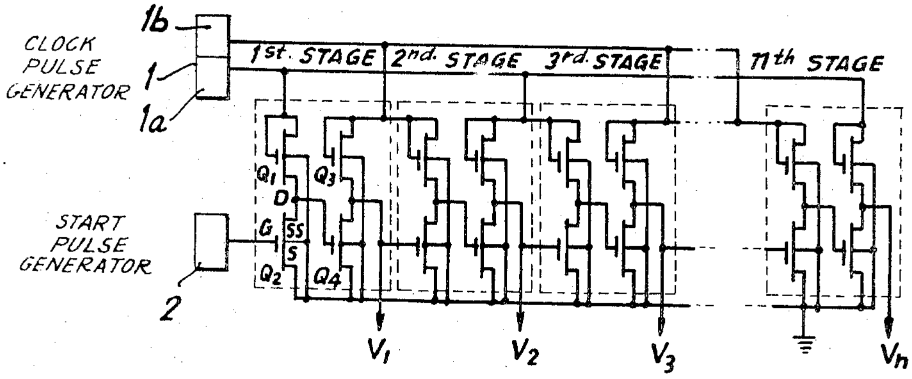
Figure 2:
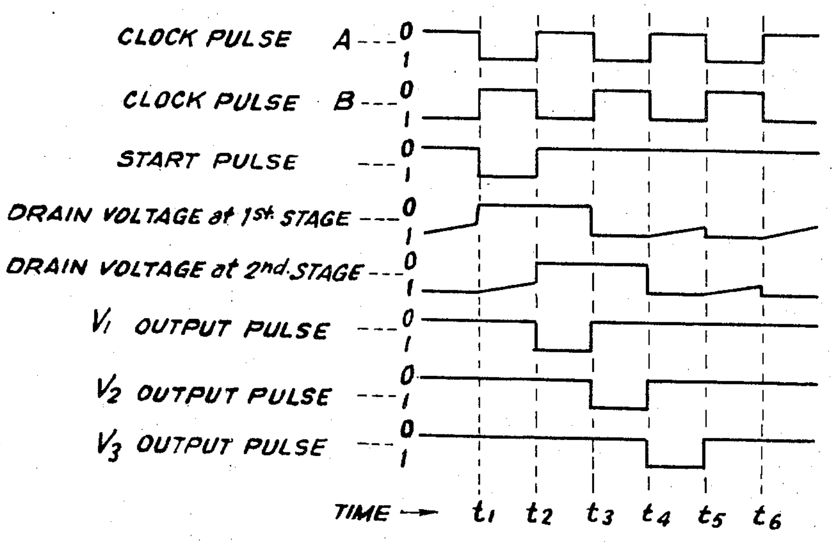

The above-mentioned features and objects of this invention and the manner of attaining them will become more apparent and the invention itself will best be understood by reference to the following description of an embodiment of the invention taken in conjunction with the accompanying drawings, wherein FIG. 1 is a circuit diagram of an embodiment of the invention; and FIG. 2 is a group of waveworms for explaining the operation of the embodiment of FIG. 1.

In FIG. 1, the symbols $Q_1$ to $Q_4$ designate insulated-gate type field-effect transistors (FET) operating in the enhancement mode. An FET pair composed of the first and second FET's $Q_1$ and $Q_2$, form a pulse width expansion circuit. Another FET's pair composed of third and fourth FET, $Q_3$ and $Q_4$, form a scanning pulse output circuit. FET's $Q_2$ and $Q_4$ respectively constitute inverter circuits, whose loads are the source-drain circuits of FET's $Q_1$ and $Q_3$. The gate and drain electrodes of FET's $Q_1$ and $Q_3$ are connected in common, so that these FET's serve as the resistive loads of the above-mentioned inverter circuits. In this case, the ratio of the mutual conductance of the FET $Q_1$ to that of the FET $Q_2$ and the mutual conductance of ratio of the FET $Q_3$ to that of the FET $Q_4$ should preferably be greater than 1 to 10 in order to reduce the offset voltage of the inverter. However, the latter ratio should be determined depending on the offset voltage and the magnitude of its load, because the greater ratio decreases the number of fan-outs obtainable from the inverter.

Each stage of the scanning pulse generator comprises a cascaded pair of pulse width expansion circuits and a scanning pulse output circuit.

A scanning pulse generator composed of *n*-stages is constructed by cascading the above-mentioned stages. The substrate electrode SS of each of the FET's is grounded. The reference numeral 1 in FIG. 1 designates a clock pulse generator comprising, for example, a free-running multivibrator for generating paired rectangular pulses having an arbitrary frequency and opposite polarities. A clock pulse *A* of normal polarity is generated from the box designated as 1*a*, while a clock pulse *B* of opposite polarity is generated from box 1*b*. Clock pulse *A* is applied so as to drive the drain electrode of each FET of the pulse width expansion circuit of each of the odd-numbered stages as well as the drain electrode of the scanning pulse output circuit of each of the even-numbered stages. Clock pulse *B* is applied so as to drive the drain electrode of each FET of the pulse output circuit of each of the odd-numbered stages as well as the drain electrode of the pulse width expansion circuit of each of the even-numbered stages. A start pulse generator 2 composed of, for example, a free-running multivibrator, generates a start pulse having a width equal to the clock pulse and a ratio equal to the reciprocal of the number *n* of the stages. The start pulse is then applied to the gate G of the second FET $Q_2$ of the first stage as the input of the pulse width expansion circuit of the same stage. In this case, it is assumed that generators 1 and 2 are in synchronization; that the start pulse and the clock pulse *A* are in phase; and that the start pulse is delayed by more than 10 nanoseconds with respect to clock pulse *A*.

The operation of the embodiment will be described with reference to FIG. 2. Since a start pulse of a logical value 1 is applied at time point $t_1$ from start pulse generator 2 to the gate G of the second FET $Q_2$ of the first stage, and since a clock pulse *A* of a logical value 1 is simultaneously applied from clock pulse generator 1*a* to the gate of the first FET $Q_1$ of the first stage, the drain potential of the second FET $Q_2$ is approximately zero during the time interval between time points $t_1$ and $t_2$. At time point $t_2$, both the start pulse and the clock pulse are returned to zero, causing the drain potential of FET $Q_2$ to be maintained approximately at zero until time point $t_3$. The drain potential of FET $Q_2$ is maintained at a voltage corresponding to the logical value 1 during the time interval between time points $t_3$ and $t_4$, because the clock pulse *A* has a logical value 1 and the start pulse has 0 during that time interval. Although clock pulse *A* is restored to 0 at time point $t_4$, the drain potential of FET $Q_2$ does not immediately return to zero. The reason for this is that a stray capacitance including the output capacitance of FET $Q_2$ and the input capacitance of FET $Q_4$ exists between the drain and source of FET $Q_2$. The stray capacitance is charged up to the voltage of the logical value 1 during the time interval between time points $t_3$ and $t_4$. At time point $t_4$, the drain potential of FET $Q_2$ is gradually lowered due to the discharging process, at a time constant determined by the above-mentioned stray capacitance and the off-state resistance of FET $Q_1$ which is in the nonconductive state because of the logical value 0 of clock pulse *A*. This time constant is approximately 0.2 second because the stray capacitance is about 2 pf. and the off-resistance of FET $Q_1$ is about $10^{11}$ ohms. As will readily be understood, this time constant is sufficiently long as compared to a half period of the scanning clock pulse. Thus, the drain potential of FET $Q_2$ barely changes and is maintained at the potential of the logical value 1.

During the time interval between time points $t_2$ and $t_3$, the FET $Q_4$ of the first scanning pulse output circuit is maintained nonconductive, because clock pulse *B* at a logical value 1 is applied to the drain of the third FET $Q_3$ from clock pulse generator 1*b* and because the drain potential of FET $Q_2$ of the pulse width expansion circuit of the first stage, that is, the gate potential of the fourth FET $Q_4$, is at a logical value 0. Therefore, the logical value 1 of clock pulse *B* establishes at the drain potential of FET $Q_4$ a scanning pulse output $V_1$ for the first stage. After time point $t_3$, the FET $Q_3$ remains conductive because the logic value of the drain potential of FET $Q_2$ in the pulse width expansion circuit of the first stage is 1 without regard to whether the logical value of clock pulse *B* is 0 or 1. Consequently, the output $V_1$ remains 0. Regarding the second stage, the output pulse $V_1$ of the first stage serves as the start pulse of the second stage. The phase relation of the clock pulses is now reversed in relation to the first stage. As a result of an operation similar to that in the first stage, the scanning pulse output $V_2$ of the second stage is obtained. A similar operation is performed in each of the following stages, producing the scanning pulse outputs at the output terminals $V_1, V_2 .... V_n$.

I claim:

1. A scanning pulse generator comprising: a plurality of paired inverter stages connected in cascade, each of said stages having an input and an output inverter circuit, each of said input and output inverter circuits comprising first and second field effect transistors, the drain electrode of said first transistor being connected directly to the source electrode of said second transistor to form serial connection of said first and second transistors, the gate and source electrodes of said first transistor being coupled to one another to make said first transistor serve as a load for said second transistor, the drain-source common junction of said input inverter circuit being connected to the gate electrode of said second transistor of said output inverter circuit, the drain-source common junction of said output inverter circuit being connected to the gate electrode of said second transistor of said input inverter circuit of the immediately succeeding one of said stages, means for supplying a pulse of a first polarity to said gate-source common junction of said first transistor of said input inverter circuit of the odd-numbered ones of said stages, and to said gate-source common junction of said first transistor of said output inverter circuit of the even-numbered ones of said stages; means for supplying a pulse of a second polarity opposite to said first polarity to said gate-source common junction of said first transistor of said output inverter of the odd-numbered ones of said stages, and to said gate-source common junction of said first transistor of said input inverter circuit of the even-numbered ones of said stages; means for supplying a start pulse to the gate electrode of said second transistor of said input inverter circuit of the first of said stages, and means coupled to the drain-source common junction of said first and second transistors of said output inverter of each of said stages for deriving said scanning pulse.